No. 882,271. PATENTED MAR. 17, 1908.
W. D. SCOTT.
SAFETY VALVE FOR WATER SYSTEMS IN CONNECTION WITH AIR BRAKE SYSTEMS.
APPLICATION FILED JUNE 22, 1907.
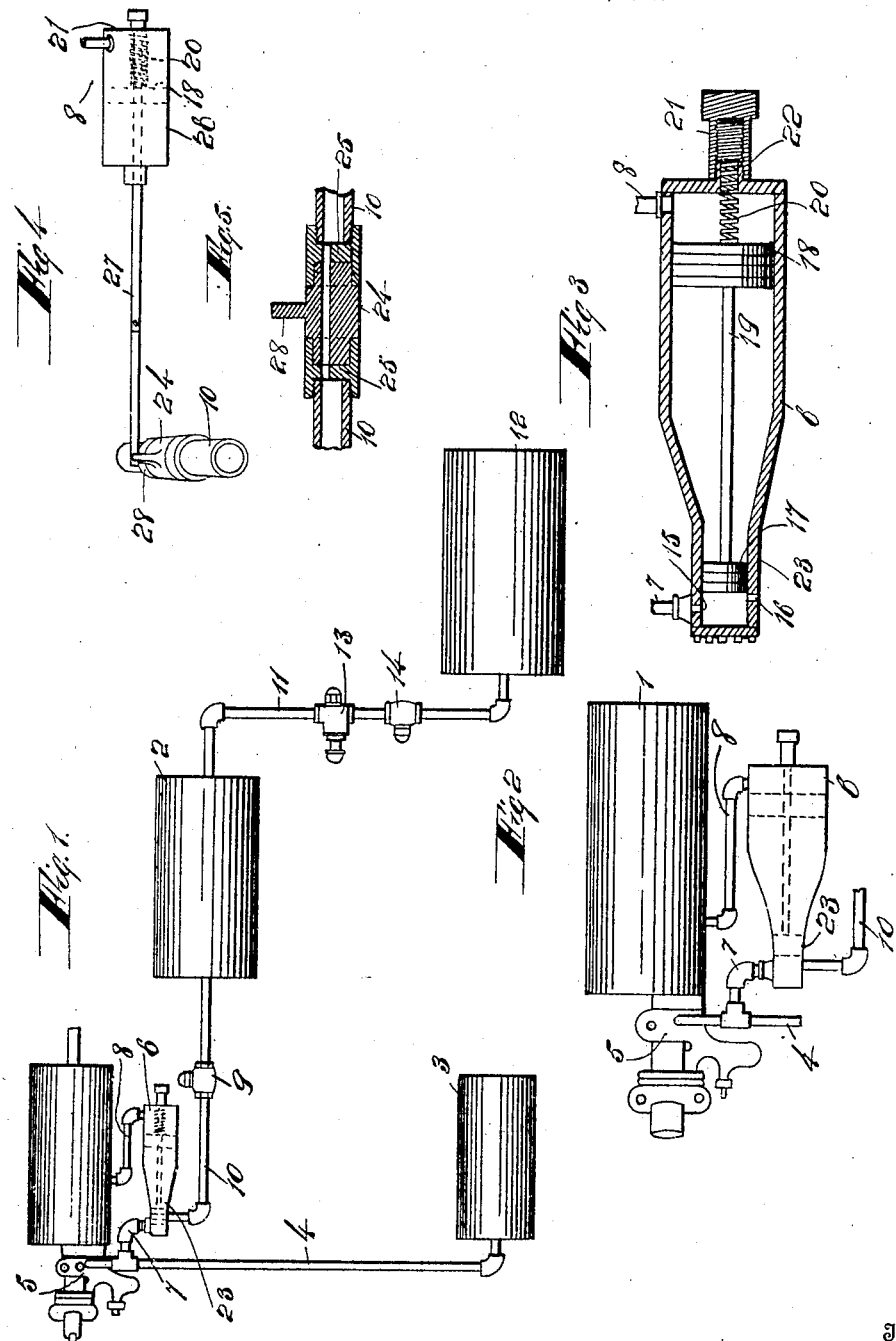
Witnesses
Inventor,
W. D. Scott,
By A. D. Jackson,
Attorney

UNITED STATES PATENT OFFICE.

WILLIAM D. SCOTT, OF SHERMAN, TEXAS.

SAFETY-VALVE FOR WATER SYSTEMS IN CONNECTION WITH AIR-BRAKE SYSTEMS.

No. 882,271.   Specification of Letters Patent.   Patented March 17, 1908.

Application filed June 22, 1907. Serial No. 380,213.

*To all whom it may concern:*

Be it known that I, WILLIAM D. SCOTT, a citizen of the United States, residing at Sherman, county of Grayson, State of Texas, have invented certain new and useful Improvements in Safety-Valves for Water Systems in Connection with Air-Brake Systems, of which the following is a specification.

My invention relates to safety valves and particularly to valves for use with water systems which are operated by air pressure from brake cylinders of air-brake systems, and the object is to provide valves which will prevent a water system from interfering with the operation of the brakes of an air-brake system when the water system is operated by air from the air-brake system.

The governor which is now used with water systems is objectionable for several reasons. The passage ways become clogged with dirt and the valves will not operate promptly. In this governor system, when a person uses water, he will use more or less air. This will cause a release of the brakes.

The improved valve is applicable to water systems of sleeping cars, dining cars, and other cars in a train of cars, as the valve will use only a small percentage of the brake power. It is absolutely safe to use air from the auxiliary reservoir and it will not endanger a train of cars if the reducing valve gets out of order. The governor now used is dispensed with and the improved valve is used to raise water to sleeping cars or other cars in a train of cars. This valve cuts off communication between the auxiliary reservoir and the water system while the brakes are in use and there will be no danger of the brakes being released by the water system or of the auxiliary reservoir being overcharged, setting the brakes harder.

Other objects and advantages will be fully explained in the following description and the invention will be more particularly pointed out in the claims.

Reference is had to the accompanying drawings which form a part of this application and specification.

Figure 1 is a diagrammatic view of the apparatus with which the valve is used, showing the valve closed to cut off communication with the water system. Fig. 2 is a similar view, showing the valve open and the pressure of the auxiliary reservoir and the water system equalized. Fig. 3 is a longitudinal section of the valve. Fig. 4 is a perspective view of the valve, showing a different application from that shown in the previous figures. Fig. 5 is a broken longitudinal section of the rotary valve shown in Fig. 4.

Similar characters of reference are used to indicate corresponding parts throughout the several views.

The improved valve is located between the ordinary brake cylinder 1 and an air storage tank 2 and also between the air storage tank 2 and the auxiliary reservoir 3, the auxiliary reservoir 3 and the brake cylinder 1 being connected by a pipe 4 and through the usual triple valve 5. The safety valve 6 has communication with the auxiliary reservoir 3 through a pipe 7 connected with pipe 4 and has communication with the brake cylinder 1 through the pipe 8 and has communication with the air storage tank 2 through pipe 10 which is provided with a non-return check valve 9. The storage tank 2 has communication through a pipe 11 with the water tank 12. The pipe 11 is provided with a reducing valve 13 which is preferably set at 20 pounds pressure. The pipe 11 is also provided with a non-return check valve 14. The valve 6 has a port 15 in communication with pipe 7 and a port 16 in communication with pipe 10. A small piston 17 and a large piston 18 mounted on a piston rod 19. A spring 20 presses against the piston 18. The tension of this spring is varied by a threaded box 21. This box is threaded intiriorly and screws on a hollow boss 22. By means of the spring adjusting box the spring 20 may be adjusted to the different pressures which may be used in a train line. The valve 6 has a reduced portion 23 in which the valve 17 reciprocates. When an engine is charging up, train air passes into the auxiliary reservoir 3 until it accumulates a little over 60 pounds, the port 16 standing closed by piston 17. As soon as the pressure goes beyond 60 pounds, the piston 17 is forced from over port 16. This port admits the air to the air storage tank 2 and the port 16 remains open as long as the brakes are not set. When the brakes are applied, air from the brake cylinder passes in behind the piston 18 and with the aid of spring 20 adjusted to 60 pounds and with the difference in size of pistons 18 and 17 moves the pistons to close the port 16 to water system. This is supposing that the train line pressure is 110 pounds. The piston 18 will have to be large enough to overcome the difference between 10 pounds brake cylinder pressure (which is minimum) and 60 pounds spring pressure, and the 110 pounds pressure on piston 17 which would be 40 pounds, as there would be a reduction in auxiliary pressure to set brakes, for instance 7 pounds. This would make the piston movement very positive in closing the ports, and when the brakes are released the 110 pounds pressure would be very positive in overcoming the 60 pound spring pressure and opening the ports to charge water system again. The valve will work equally as well when 70 pounds train line pressure is used and the spring 20 adjusted to 35 pounds pressure.

Figs. 4 and 5 illustrate a variation in the valve which may be used to close and to open the ports to the water system. The valve here shown may be used to oscillate a double seated rotary valve. The valve 24 is mounted in the pipe 10 to the water system and be provided with seats 25 screwed on the pipe 10. Ports are made through the seats 25 and a port through the valve 24. This valve 26 has a piston rod 27 pivotally engaging the valve stem 28 and the valve is connected with the brake cylinder 1 by a pipe 8 and is provided with a piston 29 and a spring 20 and adjusting box 21.

Having fully described my invention, what I claim as new and desire to secure by Letters Patent, is,—

1. A safety device for railway trains comprising a cylinder having a large portion and a reduced portion, a large piston operating in the large portion of said cylinder and a small piston operating in the reduced portion of said cylinder, a common piston rod carrying said pistons, a spring coöperating with said large piston, an adjusting spring seat for said spring, a pipe connecting the large portion of said cylinder with an air brake cylinder, a pipe connecting the reduced portion of said cylinder with the auxiliary reservoir of an air-brake system, and a pipe connecting said reduced portion of said cylinder with an air storage tank.

2. A safety valve for the water system of a train using an air-brake system having communication with the air brake cylinder, communication with the train line pressure and the auxiliary reservoir of the air brake system, communication with an air-storage tank, and pistons for opening and closing the communication of said valve with said air storage tank.

3. In a safety device for water systems of railway trains, the combination with the brake cylinder and the auxiliary reservoir, of a valve operatively connected to said brake cylinder and said reservoir, an air storage tank connected to said valve, a water tank operatively connected to said air storage tank, and pistons movable in said valve to cut off communication of said brake cylinder and auxiliary reservoir with said water tank.

4. In an air-brake system provided with an auxiliary reservoir, a brake cylinder, and pipes connecting said reservoir and said cylinder; a safety valve operatively connected with said cylinder and said reservoir, a water tank, an air storage tank between said valve and said water tank, a pipe forming a communication of said air storage tank and said water tank provided with a non-return check valve and a reducing valve, a pipe connecting said valve and said air storage tank and provided with a non-return check valve, and pistons mounted in said safety valve to open and close the communication between said safety valve and said water tank.

5. A safety valve for the water system of cars connected with an air brake system having communication with the water system and having communication with the air brake system and pistons movable therein for opening and closing the communication between said water system and said air-brake system.

6. A safety valve for the water system of cars connected with an air brake system having communication with the air brake system and communication with the water system, a large piston and a small piston and a common piston rod carrying said pistons in said valve, and a spring coöperating with said large piston and provided with means for varying the tension of said spring.

In testimony whereof, I set my hand in the presence of two witnesses, this 15th day of June, 1907.

WILLIAM D. SCOTT.

Witnesses:
A. L. JACKSON,
B. J. LORKOWSKI.